United States Patent [19]

Morris

[11] Patent Number: 5,388,704
[45] Date of Patent: Feb. 14, 1995

[54] RELATING TO CONVEYING AND SEPARATION APPARATUS

[76] Inventor: Christopher P. Morris, 303 Oakdale Road, Carlton, Nottingham. NG4 1DH, United Kingdom

[21] Appl. No.: 910,149
[22] PCT Filed: Jan. 17, 1991
[86] PCT No.: PCT/GB91/00069
§ 371 Date: Aug. 24, 1992
§ 102(e) Date: Aug. 24, 1992
[87] PCT Pub. No.: WO91/10611
PCT Pub. Date: Jul. 25, 1991

[30] Foreign Application Priority Data

Jan. 19, 1990 [GB] United Kingdom ............... 9001234

[51] Int. Cl.⁶ .................. B07B 4/00; B65G 53/16
[52] U.S. Cl. .................... 209/139.1; 209/474; 366/101; 406/88
[58] Field of Search ............ 209/138, 139.1, 154, 209/20, 133, 142, 146, 154, 474, 486; 406/62, 88, 89; 366/101

[56] References Cited

U.S. PATENT DOCUMENTS

| | | | |
|---|---|---|---|
| 2,848,820 | 8/1958 | Wallin et al. | 406/88 X |
| 3,180,688 | 4/1965 | Futer | 406/88 |
| 3,370,938 | 2/1968 | Newman et al. | 209/474 X |
| 3,826,015 | 7/1974 | Kuroyama et al. | 209/474 X |
| 4,033,555 | 7/1977 | Fong | 366/101 |
| 4,081,201 | 3/1978 | Hassan et al. | 406/88 |
| 4,089,422 | 5/1978 | Harmke et al. | 209/474 X |
| 4,299,518 | 11/1981 | Whelan | 406/62 |
| 4,543,736 | 10/1985 | Brooks et al. | 34/46 |
| 4,701,256 | 10/1987 | Cross, Jr. | 209/139.1 |
| 4,710,068 | 12/1987 | Lindstrom et al. | 406/88 |
| 4,755,284 | 7/1988 | Brooks et al. | 209/20 |
| 4,760,779 | 8/1988 | Morris | 99/475 |

FOREIGN PATENT DOCUMENTS 0259032 3/1988 European Pat. Off.
WO89/04802 6/1989 European Pat. Off.

*Primary Examiner*—D. Glenn Dayoan
*Assistant Examiner*—Tuan N. Nguyen
*Attorney, Agent, or Firm*—Basile and Hanlon

[57] ABSTRACT

An air distribution plate for incorporation into a material conveyor or a material separator has a plurality of apertured zones alternately arranged along the length of the plate. The apertures in the first series of zones are inclined in the direction of the desired flow of material in the case of the conveyor and in the direction of the desired air flow in the case of the separator and the apertures in the second series of zones incline in the opposite direction by the same amount. Each zone in the second series of zones has fewer apertures than the zones of the first series of zones.

16 Claims, 4 Drawing Sheets

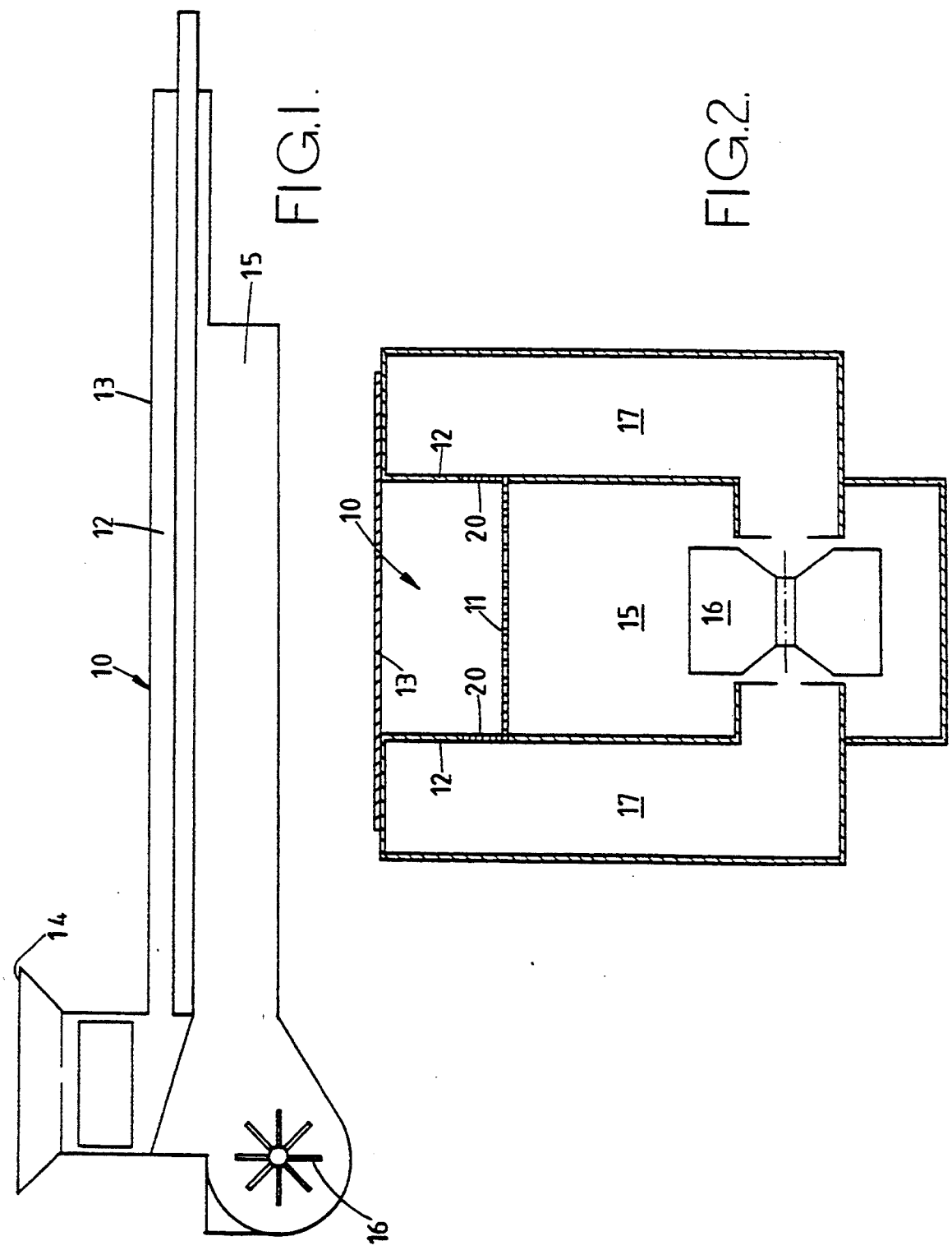

5,388,704

RELATING TO CONVEYING AND SEPARATION APPARATUS

BACKGROUND OF THE INVENTION

1. Field of the Invention

The present invention relates to a distribution plate for use in conveying and separation apparatus.

2. Description of the Art

There are a number of known forms of apparatus which are used for the conveying and/or separation of material such as, for example, tobacco leaf and stem, tea, cereal and other bulk material, using an air stream.

WO89/04802 describes both a conveying apparatus and also an apparatus for separating different grades of a material. Both forms of apparatus use a distribution plate which has a plurality of apertures through which a fluid such as air can flow. The distribution plate is adapted to direct the fluid therethrough in a direction which has a component extending along a surface of the plate as a result of which material disposed above the plate is fluidized and conveyed along the surface of the plate.

SUMMARY OF THE INVENTION

Accordingly, the present invention provides a distribution plate for a conveying or separating apparatus of the type in which material is conveyed by or separated by an air stream. The distribution plate has a plurality of apertures for directing fluid flow therethrough in a direction which has a component extending along a surface of the plate and wherein the apertures extend through the plate at respective angles to the surface of the plate in the range of substantially 65° to 85°.

Advantageously, selected apertures extend at different angles to the surface of the plate with respect to selected other apertures.

Advantageously at least some of said apertures are at an angle of 70° to the surface of the plate.

BRIEF DESCRIPTION OF THE DRAWINGS

In the accompanying drawings:

FIG. 1 shows in diagrammatic form a side view of one example of a conveying apparatus incorporating a distribution plate in accordance with the invention;

FIG. 2 is a cross sectional view laterally through the apparatus of FIG. 1;

DESCRIPTION OF THE PREFERRED EMBODIMENTS

Figure 3:
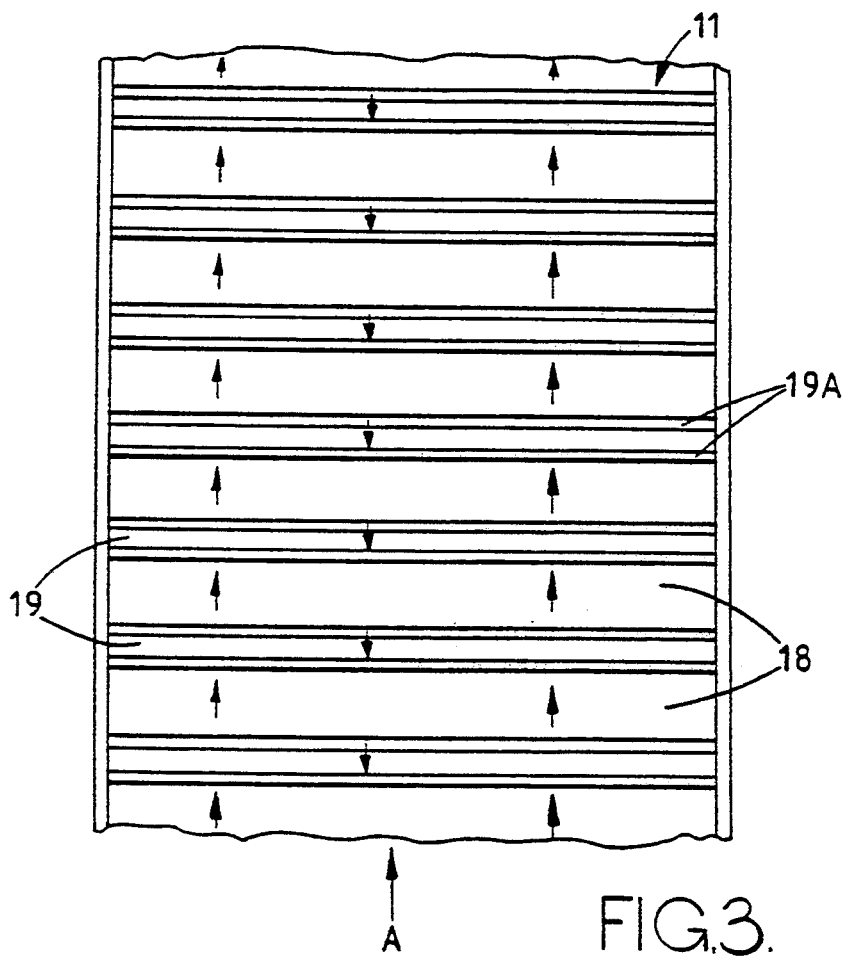
FIG. 3 is a plan view of part of the apparatus of FIG. 1.

With reference to FIGS. 1 and 2, the conveying apparatus comprises a conveying trough 10 having a base wall defined by a distribution plate 11 and side walls 12. The trough 10 is closed by a loose fitting cover 13. The base wall of the trough 10 may comprise in section, a central flat portion and side portions which incline upwardly and outwardly to the lower edges of the side walls 12 and furthermore, the side walls 12 may incline inwardly by a small amount. A feed hopper 14 is located at the inlet end of the apparatus and material fed to the hopper 14 falls down an inclined member and is deposited onto the distribution plate 11. Beneath the conveying trough 10 there is formed a first plenum chamber 15 to which air is supplied by means of a fan 16, the air passing through apertures to be described in the distribution plate 11 into the conveying trough 10. The air leaves the trough 10 through apertures in the side walls 12 thereof and flows into a pair of second plenum chambers 17 and is conveyed back towards the fan 16 for recirculation. In use, materials, such as tobacco, is loaded into the hopper 14 and is conveyed, as will be explained, along the trough 10 to the outlet end of the apparatus.

The distribution plate 11 will now be described with reference to FIGS. 3 and 4. The arrow A indicates the direction of flow of the material along the trough 10 and it will be seen that the plate 11 is formed so as to define two series of zones 18, 19 of apertures or holes. The zones 18, 19 are alternately arranged with spaces 19A between adjacent zones, in which there are no holes. The zones 18, 19 of holes may be formed in individual plates which are assembled to form the base wall of the trough 10 however, it is preferred that the distribution plate 11 is a one piece item extending, if possible, the length of the apparatus.

Figure 8:
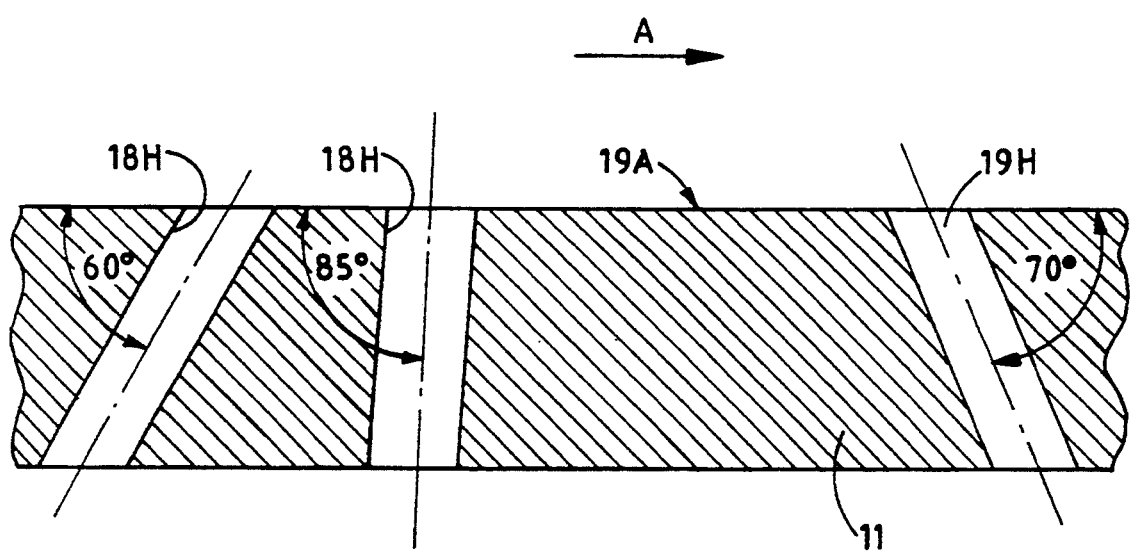
FIG. 8 is a cross-sectional view showing apertures extending through a distribution plate at an angle in a range of substantially 65° to 85° to the surface of the distribution plate, where selected apertures extend in different directions.

In the zones 18 which are of a length considered in the direction of the arrow A longer than the zones 19, the holes 18H are angled in the direction A but in the zones 19 the holes 19H are angled in the opposite direction, as shown in FIG. 8. The material forming the distribution plate 11 is conveniently stainless steel sheet and the holes are chemically etched therein. The holes are angled in the range 65°–85°, preferably 70°, to the surface of the plate 11 so that the air leaving the holes has a similar angle to the surface of the plate 11.

The air flow through each hole has a component normal to the surface of the plate 11 and a further component parallel to the surface of the plate 11 and extending in the direction A or in the opposite direction depending upon the zone in which the particular hole is situated. The components of the air flow which are normal to the plate 11 lift the material clear of the surface of the plate 11 by an amount which depends upon a number of factors such as, for example, the air pressure in the first plenum chamber 15 and the size of the holes. The component of the air flow which extends parallel to the surface of the plate 11 and which issues from the holes in the zones 18 moves the material along the trough 10. If the holes in the plate 11 were all angled in the same direction A, the material supplied to the trough 10 from the hopper 14 would tend to accelerate as it moved along the trough 10 since the force acting on the material in the trough 10 due to the components of air flow parallel to the surface of the plate 11 is cumulative. It is possible to provide a zone of appreciable length at the end of the trough 10, in which the air flow through the holes in that zone is such as to decelerate the material flowing along the trough 10, however, by providing the intervening zones 19 the rate of flow of the material is controlled throughout the length of the trough 10. Since the zones 19 are shorter in length than the zones 18, the material does move along the trough 10 in the direction of arrow A as the resultant force factor extends in the direction of the arrow A.

In a specific example, the holes are angled at substantially 70° however, holes lying in the range 65°–85° can also be used. The stainless steel sheet forming the plate 11 has a nominal thickness of 0.71 mm, the hole size is approximately 1.0 mm and there are approximately 1.8 holes per square centimeter.

The side walls 12 of the trough 10 are also provided with holes indicated at 20 in FIG. 2 to permit air to pass into the second plenum chambers 17. The holes 20 are arranged normal to the surfaces of the side walls 12 and conveniently the holes are shaped to provide a small entry aperture for the air and a larger exit aperture into the respective second plenum chamber 17.

In a first modification to the arrangement of the zones, the zones 19A in which there are no holes are omitted.

Figures 4, 5:
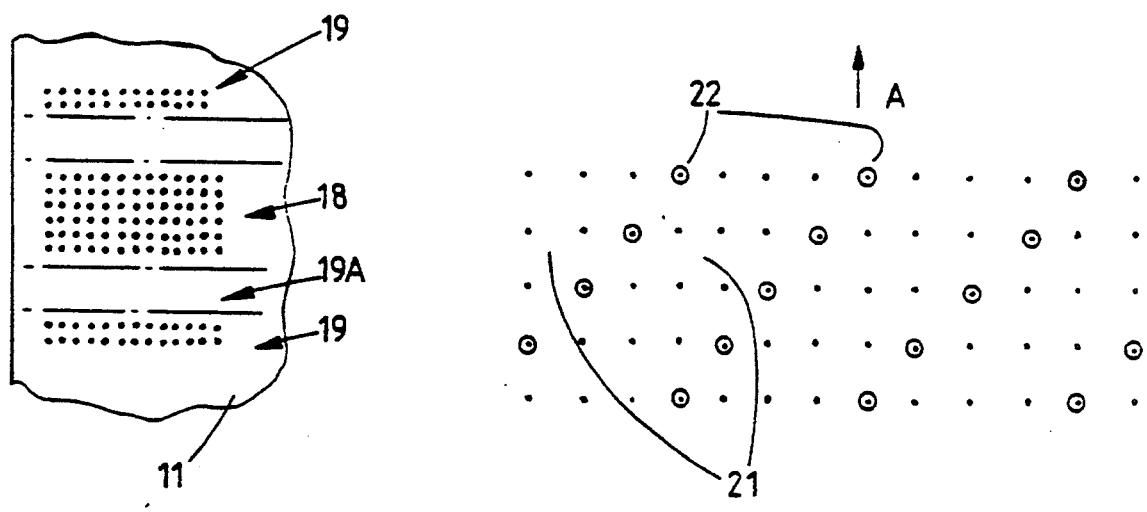
FIG. 4 shows to an enlarged scale the detail of the part of the apparatus shown in FIG. 3.
FIG. 5 shows a modified form of the part of the apparatus shown in FIG. 3.

A second modification to the arrangement of the holes in the distribution plate 11 is shown in FIG. 5 in which the zones 18 and 19 of the previously described arrangement are replaced by diagonal zones 21, 22. In the zones 21 the holes are angled in the direction of the arrow A to achieve motion of the material supplied to the trough 10 in the desired direction. In the zones 22 the holes are angled in the opposite direction and the practical effect of this arrangement is to achieve an even more uniform flow of the material along the trough 10.

Figure 6:
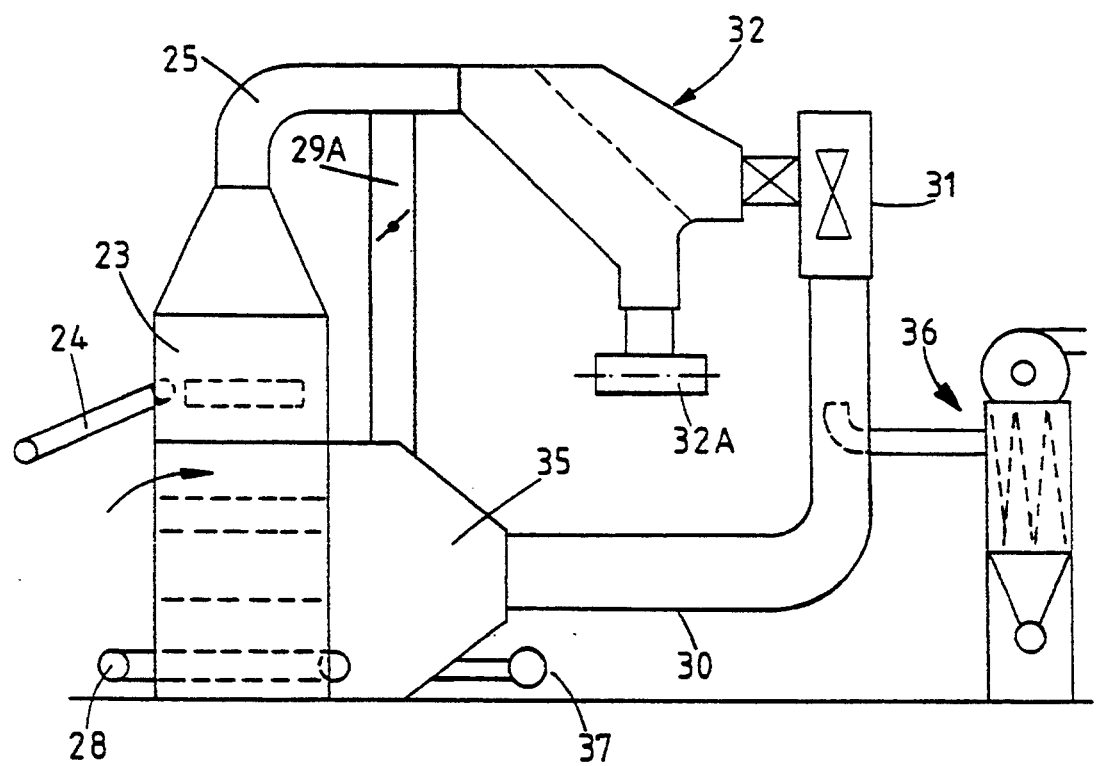
FIG. 6 is a diagrammatic side elevation of a separating apparatus incorporating a distribution plate in accordance with the invention.
Figure 7:
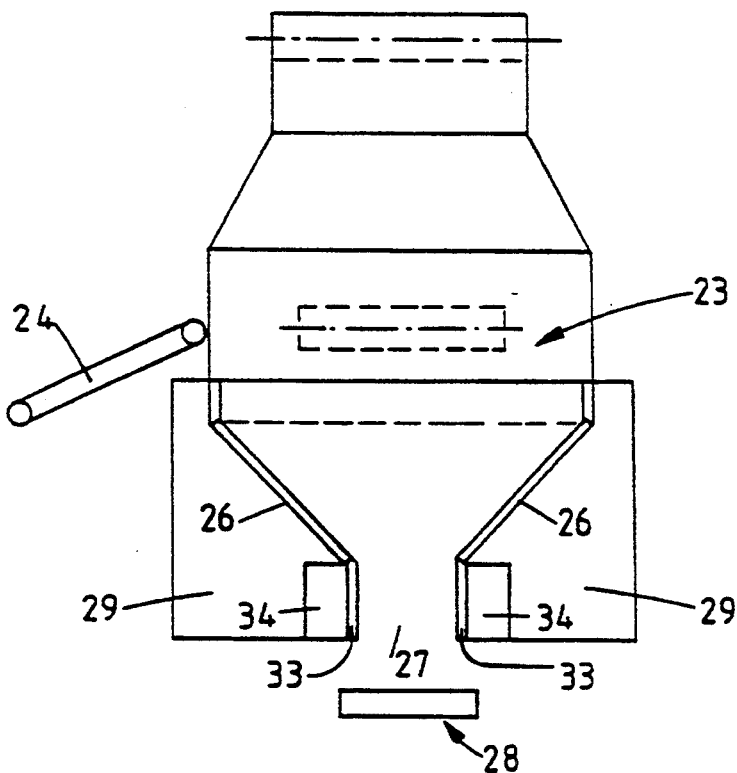
FIG. 7 is a cross sectional view of part of the apparatus seen in FIG. 6.

With reference now to FIGS. 6 and 7 there is shown a separating apparatus having a separation chamber 23 to which material such as, for example, tobacco leaf and stem can be supplied by means of a belt conveyor 24. Instead of a belt conveyor, a conveyor of the type described above can be used. The upper portion of the chamber 23 communicates with an outlet duct 25 and the lower wall of the chamber 23 is defined by a pair of inclined distribution plates 26 which are spaced at their lower ends to define an outlet 27 beneath which is arranged a conveyor 28. The side walls of the outlet 27 are formed by plates 33, respectively, in which are formed holes which incline upwardly at substantially a 45° angle. Air under pressure is supplied through the holes in the plates 33 from plenum chambers 34. The distribution plates 26 are provided with holes through which air can flow into the separation chamber 23 from plenum chambers 29 respectively. The air is supplied to the plenum chambers 29 through a conduit 30 by means of a fan 31 which draws air from the outlet duct 25. The conduit 30 leads into a diffuser section 35 which incorporates baffles to provide the desired air flow to the plenum chambers 29 and 34.

The distribution plates 26 are provided with holes in the same manner as the plates 11 described above with reference to the conveyor or trough 10. The air flowing through the holes in the plates 26 forms two upwardly flowing outer air streams the velocity of which can be controlled, for example, by controlling the speed of the fan 31 and the air flowing through the holes in the plates 33 forms a central air stream and the air flowing through the holes in the plates 33 forms a central upwardly flowing air stream. The velocity of the air stream is adjusted, in such a manner that the components of the material, which have a so called lower terminal velocity than the velocity of the air stream, are discharged through the outlet duct 25. The components of the material having a higher terminal velocity fall through the outlet 27 onto the conveyor 28. In some cases, it is desired to modify the upward flow of air in the separation chamber 23 and this can be achieved by providing valves controlled by pass ducts 29A which connect the plenum chambers 29 respectively to the outlet duct 25. By adjusting the valves the vertical air flow in the separation chamber 23 can be modified.

The air in the apparatus is recirculated by the fan 31 and a separation unit 32 of known form is provided in the outlet duct 25 and this collects those components of the material fed into the separation zone which have the lower terminal velocity. The collected material is led away from the separation unit 32 by means of a conveyor 32A which can be a belt conveyor or a conveyor of the type described above with reference to FIGS. 1 and 2. The separation unit 32 will not retain dust and this will be recirculated by the fan 31. In order to prevent build up of the dust a proportion of the air delivered by the fan 31 is removed by an extractor 36 unit which filters the air. The air which is withdrawn has to be replaced and this is conveniently effected by a pair of booster fans 37 which deliver air more or less directly into the plenum chambers 29 respectively. By careful control of the fans 37 the air pressure in the separation chamber 23 can be arranged so that it is substantially atmospheric and, as a result, there is no need to provide an air lock at the entrance of the conveyor 24 into the separation chamber 23.

The holes in the plates 26 are arranged in the same way as are the holes in the distribution plates 11 of the conveyor or trough 10. In a typical example, the plate 26 is 0.71 mm thick, the hole size 1.0 mm and there are 18.8 holes per square centimeter. The plates 26 are positioned at substantially 45° and by using holes at 70° in the configurations described, the air flow in the outer zones in the separation chamber 23 is substantially vertical. This is because the air flow in the separation chamber 23 produced by the holes which extend upwardly would, without the provision of the holes extending in the opposite direction, progressively incline towards the plate 26 in other words towards the sides of the separation chamber 23. The ratio of the holes in the zones 18 and 21 to the holes in the zones 19 and 22 is substantially 3:1.

In the case of the separating apparatus where the conveyors 24 and 32A are of the type described with reference to FIGS. 1 and 2, the supply of air thereto may be delivered from the conduit 30 in the case of the conveyor 32A and from one of the plenum chambers 29 in the case of the conveyor 24.

I claim:

1. A distribution plate for a separating apparatus of the type in which first and second materials are separated by air stream, wherein the first material has a lower terminal velocity than the air stream and the second material has a higher terminal velocity than the air stream, the distribution plate having a plurality of apertures formed therein for directing fluid flow therethrough in a direction which has a component extending along a surface of the distribution plate and wherein the apertures extend through the distribution plate at an angle in a range of substantially 65° to 85° to the surface of the distribution plate, wherein the apertures are arranged in a first series of zones spaced along the length of the distribution plate, each adjacent pair of zones of the first series being separated by a further zone forming a second series of zones, the apertures in the first and second series of zones being inclined in opposite directions to the surface of the distribution plate and there being a greater number of apertures in the first series of zones than in the second series of zones, such that the fluid flow carries the first material in the direction of the component extending along the surface of the distribution plate to separate the first material from the second material.

2. The distribution plate according to claim 1 in which the angle of the apertures is substantially 70°.

3. The distribution plate according to claim 1 in which the ratio of the number of apertures in each one of the first series of zones to the number of apertures in each one of the second series of zones is substantially 3:1.

4. The distribution plate according to claim 1 in which the first and second series of zones extend transversely of the length of the distribution plate.

5. The distribution plate according to claim 4 in which each of the second series of zones is spaced from the adjacent zones of the first series of zones by a space in which there are no apertures.

6. The distribution plate according to claim 1 in which the first and second series of zones extend diagonally to the length of the distribution plate.

7. A separating apparatus for separating different grades of material, the separating apparatus comprising:
a separation chamber having an upper outlet and a lower outlet;
means for feeding a material mixture to the separation chamber;
a pair of first plates in the lower portion of the separation chamber, the first plates inclining downwardly towards the lower outlet each first plate having apertures formed therein arranged in a first series of spaced zones along the length of the first plate from the lower outlet and a further apertured zone located between each adjacent pair of zones of the first series of zones, the further apertured zones forming a second series of zones, the apertures in the first series of zones being inclined to the surface of the first plates in a direction away from the lower outlet and the apertures in the second series of zones being inclined to the surface of the first plates in the opposite direction, in which the ratio of the number of apertures in a zone of the first series of zones to the number of apertures in a zone of the second series of zones is substantially 3:1.

8. The apparatus according to claim 7 in which the pair of first plates are inclined at substantially 45° and the apertures in the first and second series of zones are inclined at substantially 70° to the surfaces of the pair of first plates.

9. The apparatus according to claim 7 in which the first and second series of zones extend diagonally to the length of the pair of first plates.

10. A separating apparatus for separating different grades of material, the separating apparatus comprising:
a separation chamber having an upper outlet and a lower outlet;
means for feeding a material mixture to the separation chamber;
a pair of first plates in the lower portion of the separation chamber, the first plates inclining downwardly towards the lower outlet, each first plate having apertures formed therein arranged in a first series of spaced zones along the length of the first plate from the lower outlet and a further apertured zone located between each adjacent pair of zones of the first series of zones, the further apertured zones forming a second series of zones, the apertures in the first series of zones being inclined to the surface of the first plates in a direction away from the lower outlet and the apertures in the second series of zones being inclined to the surface of the first plates in the opposite direction; and
the lower outlet is defined by a further pair of apertured plates which extend downwardly from the lower edges of the first plates, the apertures in the further plates being inclined upwardly towards the upper outlet.

11. The apparatus according to claim 10 further including separate plenum chambers for supplying fluid under pressure to the apertured first and further plates respectively so as to obtain an upward flow of fluid in the separation chamber.

12. The apparatus according to claim 11 further including a fan having an inlet connected to the upper outlet and an outlet connected to the plenum chambers by way of a diffuser section.

13. The apparatus according to claim 12 further including a valve controlled by pass ducts through which fluid from the plenum chambers associated with the pair of first plates can flow to an outlet duct connected to the upper outlet.

14. The apparatus according to claim 13 further including a separation unit in the outlet duct.

15. The apparatus according to claim 14 further including an extractor for removing part of the fluid delivered by the fan to prevent a build up of dust within the apparatus and a further fan for replenishing the extracted fluid.

16. The apparatus according to claim 15 comprising a pair of further fans which supply fluid to the plenum chambers associated with the pair of first plates respectively whereby the pressure in the separation chamber is substantially atmospheric.

* * * * *

UNITED STATES PATENT AND TRADEMARK OFFICE
CERTIFICATE OF CORRECTION

PATENT NO. : 5,388,704
DATED : February 14, 1995
INVENTOR(S) : Christopher P. Morris It is certified that error appears in the above-indentified patent and that said Letters Patent is hereby corrected as shown below:

Column 1, line 56, after "invention" please delete "and".

Column 1, line 58, after "FIG. 6" please insert --; and--.

Column 4, line 20, after "extractor" please delete "36".

Column 4, line 20, after "unit" please insert --36--.

Signed and Sealed this

Twenty-third Day of May, 1995

Attest:

BRUCE LEHMAN

*Attesting Officer*  *Commissioner of Patents and Trademarks*